(No Model.)

H. H. CUMMINGS.
EYELETING MACHINE.

No. 327,142. Patented Sept. 29, 1885.

Fig. 1.

Witnesses:
H. E. Remick.
Eugene Humphrey

Inventor:
Henry H. Cummings
per Porter & Hutchinson
Attys.

Fig. 2.

(No Model.) 7 Sheets—Sheet 4.

H. H. CUMMINGS.
EYELETING MACHINE.

No. 327,142. Patented Sept. 29, 1885.

Fig. 4.

Witnesses:
H. E. Renwick
Eugene Humphrey

Inventor:
Henry H. Cummings
per Porter & Hutchinson
Attys (No Model.) 7 Sheets—Sheet 6.

H. H. CUMMINGS.
EYELETING MACHINE.

No. 327,142. Patented Sept. 29, 1885.

Witnesses.
A. E. Remick
Eugene Humphrey

Inventor.
Henry H. Cummings
per Porter & Hutchinson
Attys.

(No Model.) 7 Sheets—Sheet 7.

H. H. CUMMINGS.
EYELETING MACHINE.

No. 327,142. Patented Sept. 29, 1885.

Witnesses
H. E. Remick
Eugene Humphrey

Inventor
Henry H. Cummings
per Porter & Hutchinson
Attys.

UNITED STATES PATENT OFFICE.

HENRY H. CUMMINGS, OF MALDEN, ASSIGNOR OF ONE-HALF TO JOHN J. SULLIVAN, OF IPSWICH, MASSACHUSETTS.

EYELETING-MACHINE.

SPECIFICATION forming part of Letters Patent No. 327,142, dated September 29, 1885.

Application filed May 29, 1882. Renewed December 22, 1884. (No model.)

*To all whom it may concern:*

Be it known that I, HENRY H. CUMMINGS, of the city of Malden, State of Massachusetts, have invented Improvements in Eyeleting-Machines, of which the following is a specification.

This invention relates to machines which automatically punch the holes and insert the eyelets therein; and it consists in the construction and combination of the divers devices embodied therein, as hereinafter more particularly and fully set forth and claimed.

Figure 2:
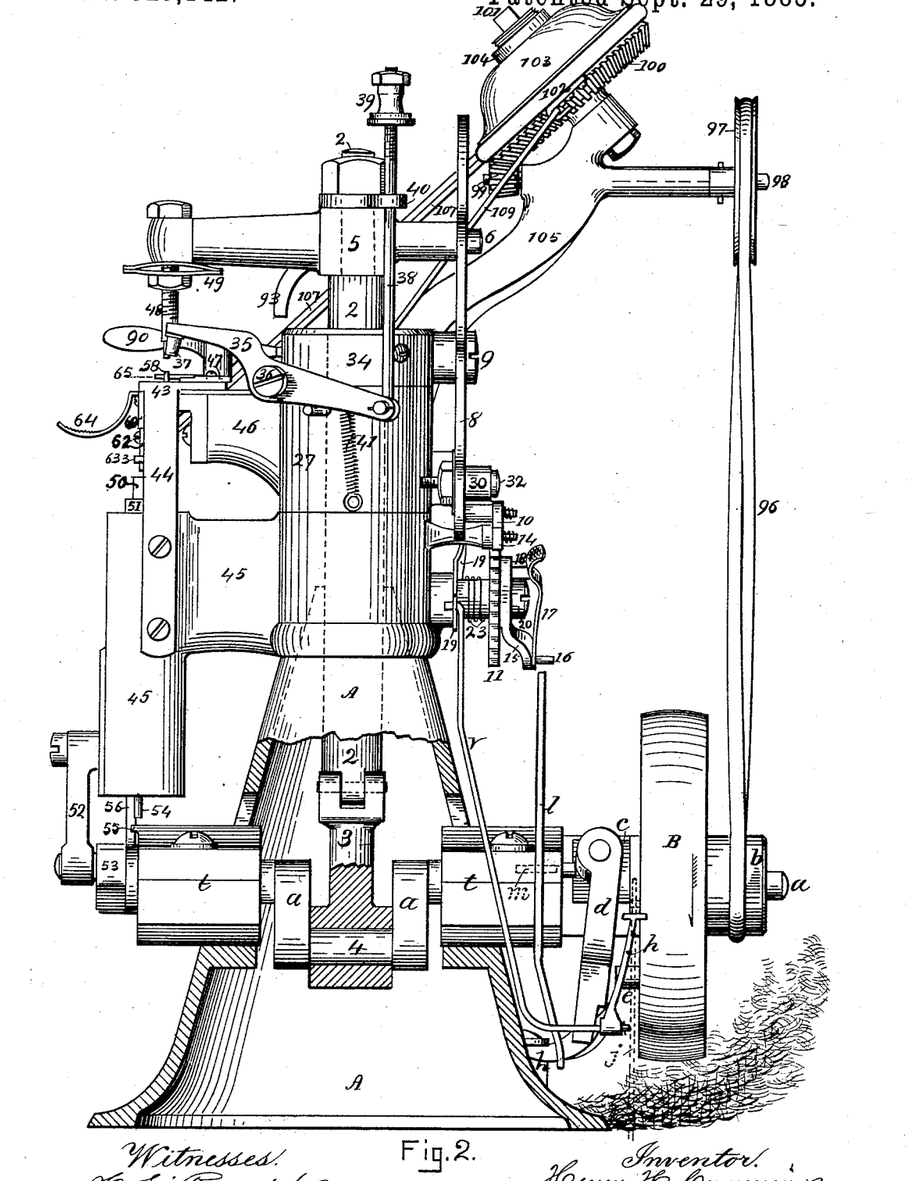
Fig. 2 is a side elevation taken as viewed from the right in Fig. 1, a portion of the shell of the base being shown as broken away to expose the interior parts.
Figures 6, 9, 10:
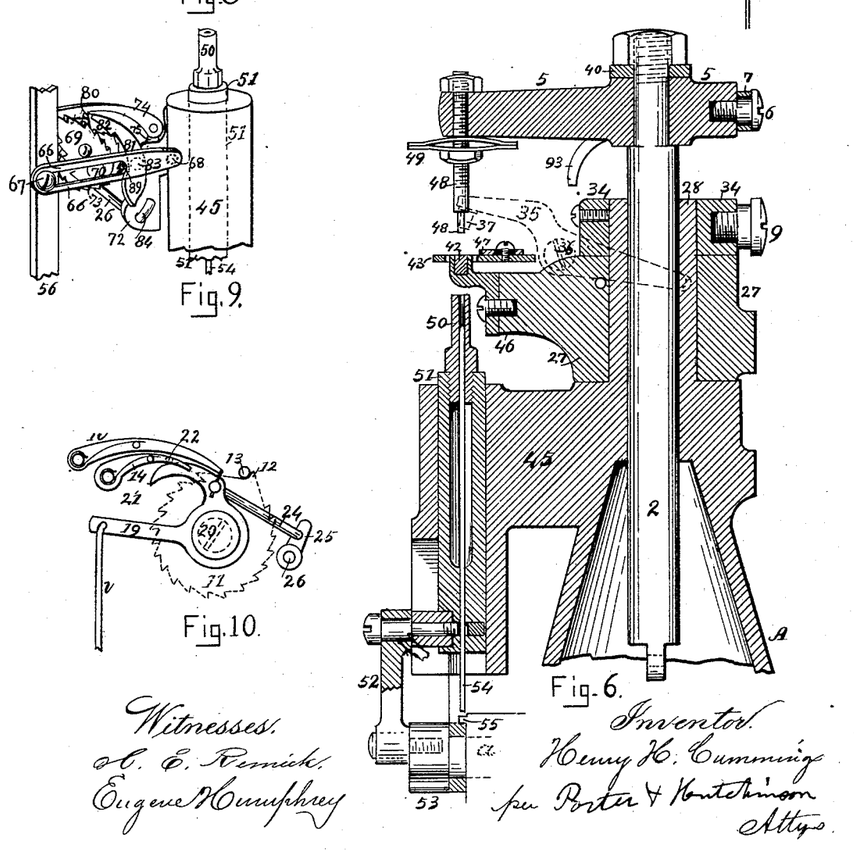
Fig. 6 is a detached vertical section taken through the center of the upper portion of the frame, and showing the eyelet-setting devices.
Fig. 9 is a perspective view taken as viewed from the right and rear of Fig. 8, and showing as far as possible the devices in said Fig. 8.
Fig. 10 is a detached side elevation showing the ratchet through which the driving-clutch tripping mechanism is actuated, the pawls that engage said ratchet, and the means for actuating the spacing-ratchet tripper.

In said views, A represents the frame or pillar of the machine, on which the respective parts are mounted and supported, said pillar being formed with a hollow base, as shown in Figs. 2 and 6, and being arranged to be bolted or screwed to a bench, table, or other suitable support.

Figure 3:
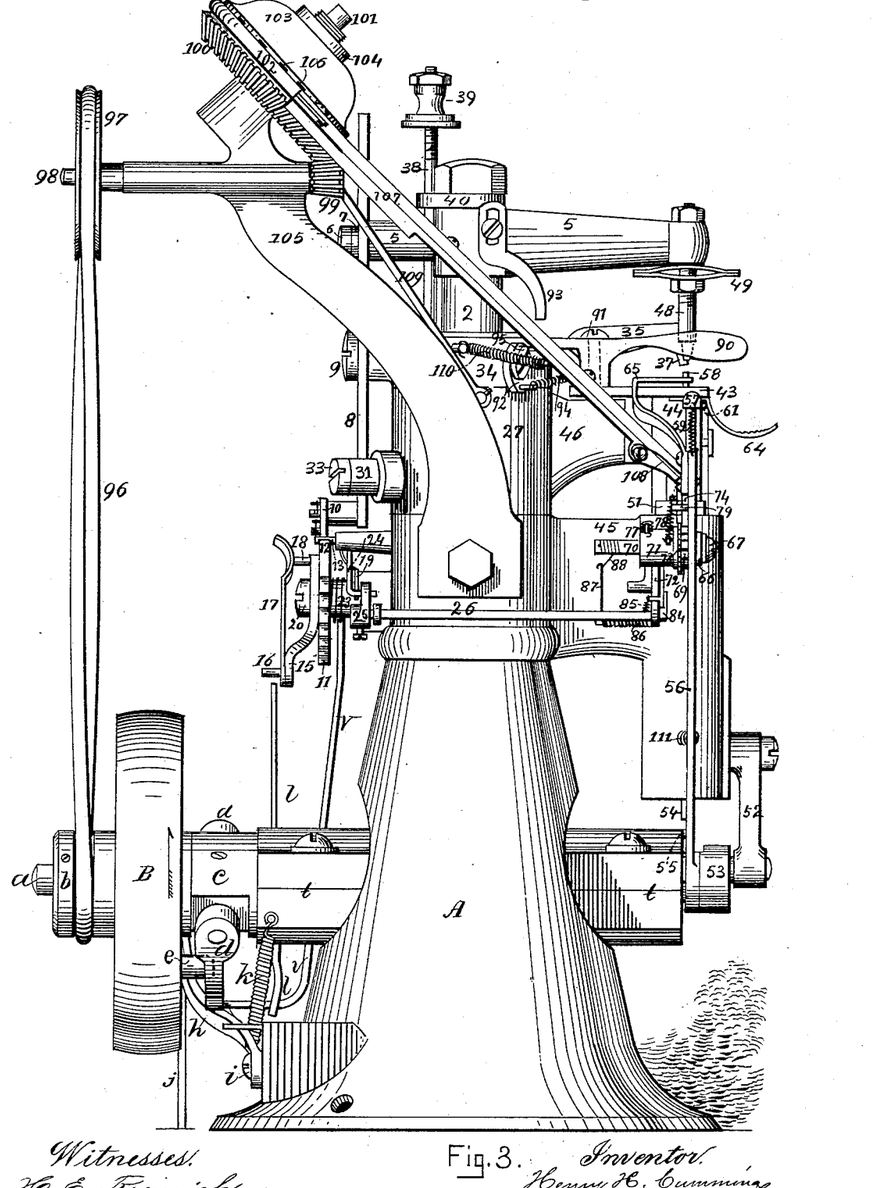
Fig. 3 is a side elevation taken as viewed from the left in Fig. 1.
Figure 12:
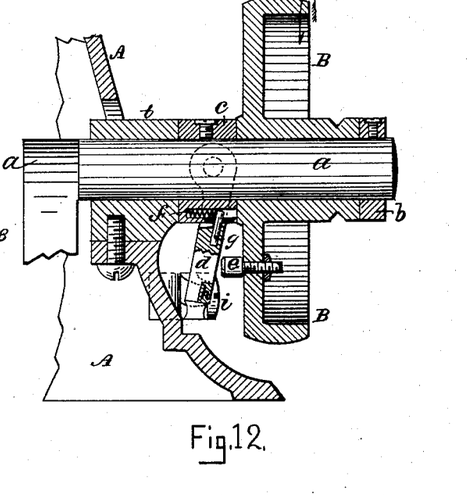
Fig. 12 is a detached vertical section taken through the center of the driving-pulley, and showing the clutch mechanism as tripped or thrown out of contact.

Power or motion is imparted to the machine by a driven belt acting on pulley B, which is loosely mounted on crank-shaft $a$, and by a clutch mechanism, next to be described, imparts rotation to said shaft in the direction indicated by the arrows on said pulley. Said pulley is secured between the outer set-collar, $b$, and the inner set-collar, $c$. Upon collar $c$ is pivoted the forked clutch lever $d$, as shown in Figs. 1, 2, 3, 7, 12. Said lever is arranged to vibrate freely upon its pivots, which are fixed in collar $c$, and when not otherwise controlled it is forced toward pulley B, as will be described, in order that stud $e$, Figs. 1, 2, 3, 7, 12, secured in the pulley, may engage it, as shown in Fig. 3, and thereby impart a rotary movement to shaft $a$ coincident to that of the pulleys. The devices which press lever $d$ against pulley B are shown in Fig. 12, and consist of a coiled spring, $f$, seated in a longitudinal passage in collar $c$, arranged to bear against a pin, $g$, seated in lever $d$ and entering a slot in $c$ and engaging the end of spring $f$, so that when the lever is moved from the pulley the spring is thereby compressed, and when the lever is released the spring forces it into contact with stud $e$, as described.

Figure 1:
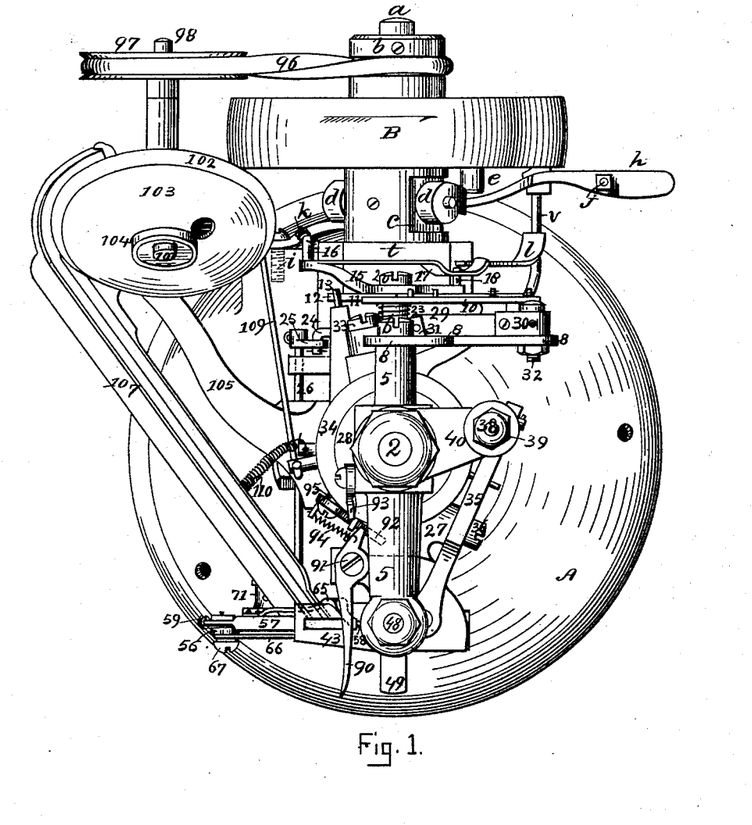
Figure 1 is a top or plan view of a machine embodying my invention.
Figure 7:
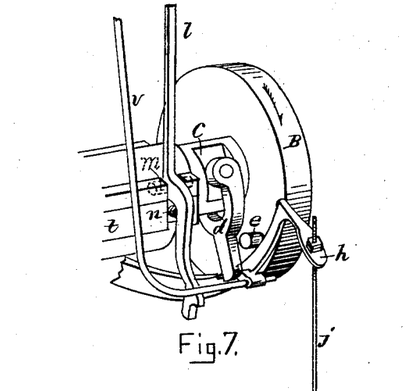
Fig. 7 is a detached perspective view showing the clutch devices whereby the machine is rendered operative or inoperative.

To disengage lever $d$ from pin $e$, a curved or cam-like lever, $h$, is pivoted to standard A at $i$, Figs. 1, 3, 4, and is formed with both a vertical and lateral curve, as shown in Figs. 1, 2, 3, and 7, and so arranged that when its free end is depressed, which is effected by the operative either by grasping said free end with the hand or by means of a treadle attached to rod $j$, Figs. 5, 7, which is connected with said lever $h$, as shown, and when depressed it is below the path of lever $d$, as shown in Fig. 3, and said lever $d$ will, by means already described, remain in contact with stud $e$; but when lever *h* is elevated by its spring *k*, Figs. 1 and 3, it is in the path of clutch-lever *d* and disconnects the same from stud *e*, a shoulder on lever *h*, (shown by dotted lines in Fig. 4.) serving at the same time to arrest and detain clutch-lever *d* and hold it from rotation, as shown in Figs. 2, 7, 12. When lever *h* is depressed, as described, its connecting-rod *v* is engaged by the lower end of lever *l*, which is pivoted at *m* in journal-box *t* of shaft *a*, as shown in Figs. 2, 7, and is pressed into contact with rod *v* by its coiled expanding-spring *n*, Fig. 7, said lever *l* being disconnected from rod *v*, for the purpose of stopping the machine, by means to be described.

Figure 11:
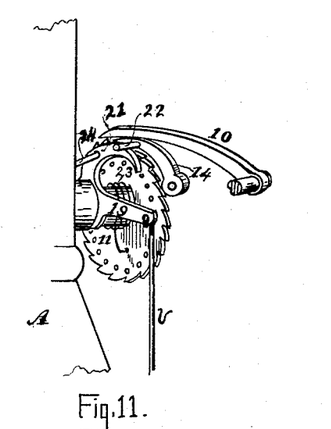
Fig. 11 is a detached perspective view taken as viewed from the rear of Fig. 10, and showing the ratchet and pawls shown in Fig. 10 and the devices for tripping the same.

A vertical plunger, 2, journaled in the axis of frame A, is connected by pitman 3, Fig. 2, with the wrist-pin 4 of crank-shaft *a*, and is by the rotation of said shaft reciprocated in accordance with the throw of said crank. Upon the upper end of said plunger is rigidly secured a cross-head, 5, in the short arm of which is threaded the pivot-screw 6, on which is mounted the trundle 7, Fig. 6, which travels in the cam-slot in cam-lever 8, Figs. 1, 2, 4, which lever is pivoted at 9 on set-collar 34, and hence as pulley B revolves arbor *a* and its crank reciprocates plunger 2, the lever 8 will be vibrated on its pivot 9 to the extent of the throw of the cam-slot in which trundle 7 travels. In the lower end of cam-lever 8 is pivoted a pawl, 10, which actuates a ratchet, 11, which is pivoted to frame A, as shown in Figs. 2, 3, 4, and which ratchet is formed with a hook or projection, 12, which engages and rests against stud 13, secured in frame A, when the ratchet is at the initial or starting point. A relief-pawl, 14, to coact with pawl 10, is pivoted upon a stud secured in an arm of frame A. An arm, 15, is mounted upon the pivot of ratchet 11, as shown in Figs. 2, 3, 4, and is provided with a stud, 16, to engage the upper end of tripping-lever *l*. A spring, 17, is secured to the projecting end of arm 15, as shown in Figs. 2, 3. The opposite or free end of said spring is provided with a stud, 18, which passes through arm 15 and extends into ratchet 11, where it is brought opposite either of the numbered holes therein shown in Fig. 4; and as, by devices yet to be described, one eyelet is set at each reciprocation of plunger 2, and the numbered holes in ratchet 11 are coincident with its teeth, and as said ratchet is moved one tooth at each reciprocation of said plunger, and as stud 16 in arm 15 is in contact with tripping-lever *l* when stud 18 of spring 17 is seated in hole 1 in the ratchet, therefore by seating stud 18 in the hole bearing a number corresponding with the number of eyelets which it is desired to set in a row or before stopping the machine, only that number can be set before the machine will be automatically stopped by means of stud 16 engaging lever *l* and disengaging the same from rod *v* of cam-lever *h*, as before described. When lever *l* is tripped from rod *v*, as just described, and said rod is raised, along with cam-lever *h*, by elevating-spring *k*, as before described, said rod *v*, which at its upper end is connected with a lever, 19, which is formed with an eye and journaled on screw-stud 20, which constitutes the pivot of ratchet 11, Figs. 2, 3, 10, will carry up lever 19, and thereby disengage pawls 10 14 from ratchet 11 by the action of the finger 21, which engages stud 22, projecting from pawl 14, as shown in Fig. 11, said pawl 14 engaging and raising pawl 10. When said pawls are thus raised the coiled spring 23 returns ratchet 11 to its normal or initial position, as shown in Figs. 4 and 10. When lever 19 is raised by rod *v*, as described, rod 24, Figs. 1, 3, 4, 10, which connects finger 21 with arm 25, secured on rock-shaft 26, same figures, serves to rock said shaft for the purpose of tripping or disengaging the spacing devices, which action will, in connection with the spacing devices, be described in their order.

The punching and eyelet-setting devices are described as follows: A collar, 27, is loosely mounted on sleeve 28 of frame A, Fig. 6, and a slight circumferential vibration is imparted to said collar by cam-lever 8, Fig. 4, by means of connecting-rod 29, which, by vertical pivots, as shown by dotted lines, is at its respective ends connected with stirrups 30 and 31, the former being pivoted at 32 to lever 8, and the latter at 33 to said collar 27, and hence collar 27 is vibrated to the extent of the throw of cam-lever 8. A lever, 35, pivoted at 36 on collar 27, Figs. 1, 2, carries at its outer end the perforating-punch, 37, and its inner end is connected with its actuating-rod 38, which passes through arm 40, secured on plunger 2 above cross-head 5, said arm by its contact with nut 39 on rod 38 serving to actuate lever 35 and its punch, when plunger 2 rises by the described action of crank-shaft *a*, lever 35 being returned to the position shown in Fig. 2 by its retracting-spring 41, there shown. A cutting-block, 42, Fig. 6, supported by a projecting-arm, 46, of vibrating collar 27, is arranged to coact with punch 37, the material to be punched resting upon table 43, which is supported by standard 44, Fig. 2, secured to arm 45 of frame A. The adjustable edge-gage 47, arranged on table 43, serves as the means of determining the distance from the edge of the material at which the holes shall be punched. The long arm of cross-head 5 carries the upper eyelet-setting punch, 48, which is provided with the relief-spring 49, Figs. 2, 3, 6, which compensates for inequalities in the thickness of material in which eyelets are being set. The lower and coacting setting die or punch, 50, is carried by plunger 51, which is vertically reciprocated by pitman 52, which is secured to and actuated by crank 53, secured upon shaft *a*, Figs. 2, 3, 6. An eyelet-carrying rod, 54, is axially seated in plunger 51 to slide therein, but by its friction to retain its position at any point therein when not acted upon. Said rod 54 is forced downward by the diminished point of punch 48, which enters the passage in the lower set, 50, secured in plunger 51, when the latter rises, and by the contact of said rod 54 with seat 55, Figs. 5, 6, it is forced out at the top of set 50 as the latter descends, so as to take the eyelet from the end of chute 107, when the same is swung into position for that purpose, as will be described, and carry the same into the hole formed by punch 37, as before described, said punch 37 and block 42 being swung out of the path of the eyelet-setting punches 48 and 50 by the vibration of collar 27 when said punches 48 and 50 are widest separated.

The spacing devices are described as follows: An arm, 56, Figs. 2, 3, 5, is pivoted on shaft $a$, and a short horizontal arm, 57, is pivoted to the top of 56, and formed with a spur, 58, which extends up through a slot in table 43 and above said table, said slot being arranged in line with the vertical operative path of perforating punch 37 and set-punches 48 50, in order that said spur may successively enter the eyelets as they leave said setting-punches 48 and 50. Said arm 57 is habitually held against the under side of table 43 by the contractile force of spring 59, which is attached to the rear end of said arm and to standard 56, and for the purpose of depressing arm 57 to release its spur 58 from the eyelet an angle-lever, 60, is pivoted to standard 44 of table 43, its horizontal arm extending under said table and overlapping arm 57, as shown in Fig. 5, and resting upon a stud, 61, which projects from arm 57, and by which lever 60 depresses said arm 57. Lever 60 is actuated through angle-lever 62, which is pivoted to standard 44 in like manner as is lever 60, the arm of 62 above its pivot engaging the arm of 60 below its pivot when the long arm of 62 is raised by the contact of its pin 63 with the end of plunger 51 when the same rises, the rising of lever 62 serving to depress lever 60, and thereby depressing arm 57, and so withdraws its spur 58 from the material being eyeleted. A pin, 633, also secured in standard 44, engages the lower vertical arm of lever 62, and sustains said lever in the position shown in Fig. 5 when not engaged by plunger 51. A thumb-piece, 64, of arm 60 enables the operator to depress said arm, and thereby depress arm 57 whenever desirable, and a "keeper," 65, secured to lever 56, Figs. 1, 2, 3, 5, extends behind and then above and over table 43 in a manner to allow the material being eyeleted to pass between said table and keeper.

Figure 4:
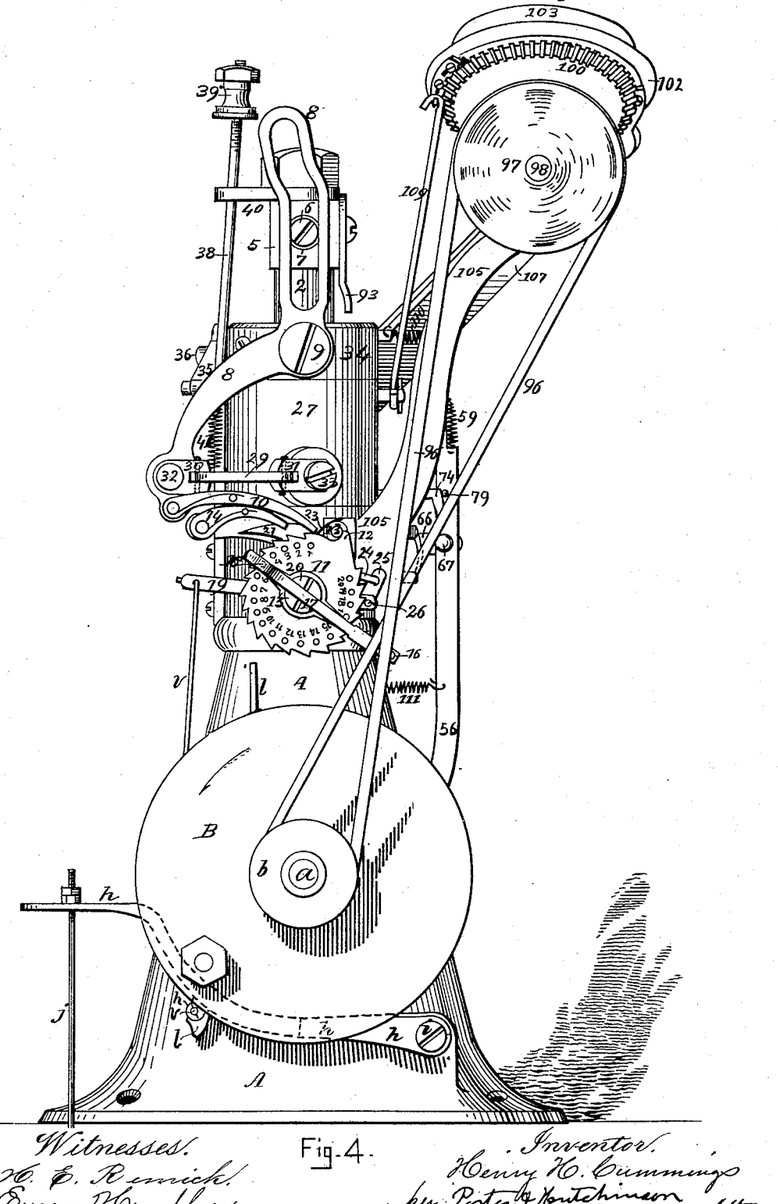
Fig. 4 is an elevation taken as viewed from the top or farther side in Fig. 1.
Figure 5:
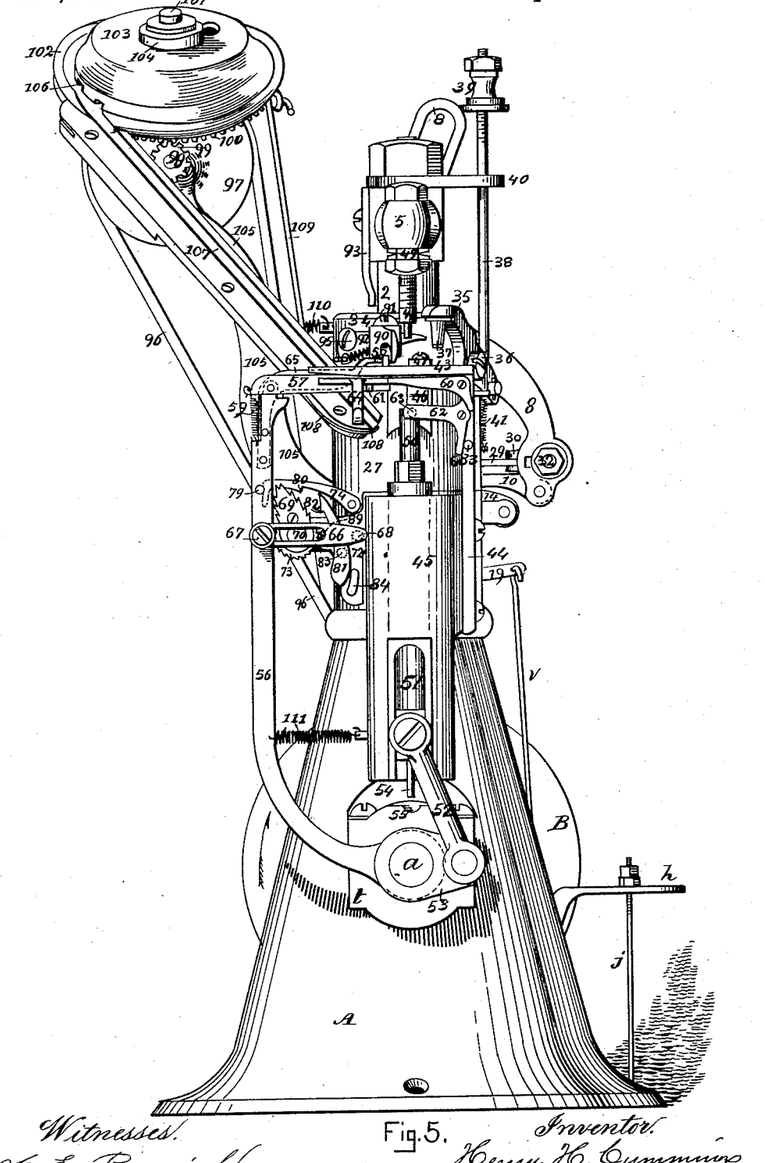
Fig. 5 is an elevation taken as viewed from the bottom or near side in Fig. 1.
Figure 8:
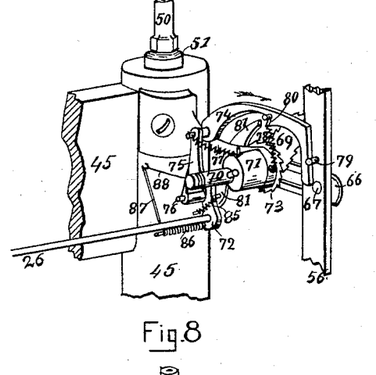
Fig. 8 is a detached perspective view showing an automatic spacing or graduating mechanism, whereby the distance between the eyelets may be varied at intervals as desired.

When the first hole has been eyeleted in any article, and the article is then drawn forward, (from right to left, as in Fig. 5,) the spur 58 of arm 57 will enter the eyelet when the latter reaches the position of the spur, and will remain therein until the next rise of plunger 51 releases it through the action of levers 60 62, as before explained, the operator drawing the material to the left, as stated, at the rising of upper eyelet-punch, 48, lever 56 being returned at each setting of an eyelet to its normal position by the contractile force of its helical spring 111, Figs. 3, 4, 5, the distance to which the material may be moved (being the distance apart that the eyelets shall be set) being governed by devices as follows: A slotted gage-arm, 66, is secured on vibrating arm 56, so as to be lineally adjustable thereon, and is provided with an inwardly-projecting stud, 68, (shown by dotted lines in Fig. 5,) to engage in the toothed gage-cam 69, secured to arbor 70, Figs. 3, 5, 8, which rotates in hub 71 of arm 72, which extends from projection 45 of the frame. When it is desired to arrange the eyelets at a uniform distance apart, all the teeth in spacing-cam 69 are at the same distance from its center and from each other; but when it is desired to place the eyelets at varying distances apart, then said cam is formed with an irregular outline, as shown—that is, with such form as will effect the requisite spacing of the eyelets. Said cam is moved one tooth at each reciprocation of the perforating and eyeletting punches by the action of arm 56 through the following devices: A ratchet, 73, is secured on arbor 70 beside cam gage 69, and provided with teeth coincident with the teeth in said cam, and is rigidly secured to said spacing-cam. Said ratchet is actuated by a pawl, 74, which is pivoted upon arm 75, which latter is pivoted upon stud 76, projecting from arm 72, Fig. 8. When arm 56 is moved to the left, Fig. 5, which is to the right in Fig. 8, in order to carry forward the material after an eyelet is set, as described, spring 77, secured to arm 75 and hub 71, will by its contractile force move pawl 74 outward, as indicated by the arrow in Fig. 8; and when said lever 56 is moved in the reverse direction, its pin 79, acting against the end of said pawl, will force it back, and by the contact of its tooth 80 with ratchet 73 it will move gage-cam 69 one tooth, and as stud 68 in said arm 66 on said lever 56 is arrested by the teeth of said spacing-cam, therefore the distance to which said lever may be moved outwardly with the article being eyeleted is governed by said cam, and hence the shape of said cam will at all times control the distance apart of the eyelets. Said pawl 74 is held down in contact with ratchet 73 by a helical spring, 78; but in Fig. 8 said pawl is shown as raised out of position in order to more clearly exhibit its form. A relief-pawl, 81, Fig. 9, pivoted to arm 72 at 83, is formed with a tooth, 82, to engage and hold the ratchet when pawl 74 is being returned, and is arranged directly beneath pawl 74, and so raises the same out of contact with said ratchet 73 when rocked by the angle 84 of rock-shaft 26, which is actuated through rod $v$, Figs. 2, 3, 4, 5, 7, angle-lever 19, rod 24, and crank 25, Fig. 10, as set out in the first part of this specification. Said relief-pawl 81 is normally held in contact with ratchet 73 by the contractile force of spring 85, Fig. 8, secured to it below its pivot 83, Fig. 9. When said rock-shaft 26 so releases the pawls from ratchets 73, the same, and also cam 69, are returned to first position by the action of helical spring 86, mounted on a stud, as shown in Fig. 8, and whose arm 87 is connected by a cord, 88, wound and secured on arbor 70, so that when cam 69 is actuated by the pawls acting on ratchet 73 said spring 86 is tightened or strained, and its reaction returns said cam to first position. When said ratchet and cam return to first position, they are arrested by stud 89, Fig. 5, secured in arm 72, on which the pawls and ratchets are supported. A rest or support for the operator's thumb or for the implement by which the material is held while the first eyelet is being inserted is shown at 90, Figs. 1, 2, 3, 5, it being pivoted at 91 to an extension of table 43, Fig. 1, and is held in normal position, as in Fig. 1, by a catch-lever, 92, pivoted on set-collar 34, which catch-lever is depressed or unlocked from the support 90 by the vertical action of depresser 93, secured to cross-head 5, Fig. 5, which as it descends carries downward said catch-lever 92, thereby releasing 90, which is then swung to the left, as viewed in said Fig. 5, out of the way of the operator; when the thumb of the operator or the implement by which the material is held have passed said rest 90, it is then, with catch-lever 92, restored to first position by the action of helical spring 94, which is connected with said rest 90, as shown in Fig. 1, and with catch-lever 92 below its pivot 95, as shown in Fig. 5, and so restores them to their interlocked position.

Figure 13:
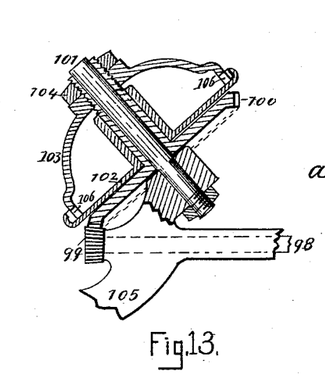
Fig. 13 is a detached vertical section taken through the center of the eyelet-turret and its driving-gear, its arbor being shown in elevation.

The eyelet-supplying devices are described as follows: A belt, 96, is driven by the hub of driving-pulley B, Figs. 1, 2, 3, 4, and actuates pulley 97, and its arbor 98, and pinion 99, both said pulley and pinion being rigidly secured to said arbor, said pinion meshing into and driving the turret-gear 100, which is mounted on fixed stud 101, which, together with 98, is supported by arm 105, secured to frame A. The bottom 102 of the turret, Fig. 13, is seated upon gear 100 and the sleeve thereof, and the cap 103 of the turret is threaded upon said sleeve, so as to be adjustable relatively to bottom 102, and is locked on said sleeve by locknut 104, as shown. Around the base of cap 103 are arranged the apertures 106, of a size and form to allow the escape of the eyelets, with their base or flange resting on bottom 102, into chute 107, in the usual manner, and as the eyelets are agitated by the rotation of the turret by the means described, when the eyelets reach the lower end of chute 107 they are arrested by detaining-spring 108, Figs. 3, 5, which holds the lower eyelet in position to be entered and carried into position for setting in place by the described eyelet-carrying rod 54, Figs. 2, 3, 5, 6. Said chute is vibrated out of the path of said carrier 54 by means of rod 109, Figs. 1, 2, 3, 4, 5, which is hooked at one end to bottom 102 of the turret, which supports and carries the chute, and at the other end to vibrating collar 27, which carries the eyeleting-punches before described, and said chute is returned into the path of carrier-rod 54 by the contractile action of spring 110, arranged as shown in Figs. 1, 3, 4, 5.

What I claim as my invention is—

1. In an eyeleting-machine, an index disk or ratchet, 11, and an adjustable arm or tripper coacting therewith, in combination with the driving mechanism adapted and arranged to disconnect the same from the eyeleting devices when the number of eyelets are inserted for which said index and tripper are adjusted, substantially as specified.

2. The combination of a perforating-punch, 37, and an eyelet-setting punch, 48, with a die or set, 50, and spacing or gage cam 69, constructed and arranged with coacting devices, whereby the material may be perforated and the eyelets inserted at automatically-governed distances from each other, as controlled by said cam, substantially as specified.

3. In an eyeleting-machine, the combination of eyelet-setting punch 48 and its coacting die or set 50, both arranged to reciprocate in a fixed path, and a perforating-punch, 37, and block or anvil 42, both mounted upon supports pivotally arranged and provided with actuating devices, whereby as punch 48 and die 50 separate, the perforating-punch 37 and its block 42 are swung into the reciprocating path thereof and at that point perforate the material to be eyeleted, substantially as specified.

4. In an eyeleting-machine, the combination of pivotal clutch $d$, mounted on rotary shaft $a$, cam-lever $h$, its connecting-rod $v$, and elevating-spring $k$, the tripping-lever $l$, the tripper 15, carried by and adjusted upon ratchet 11, to engage lever $l$ and said ratchet, with actuating-pawls 10 14, arranged to be released from the ratchet by rod $v$ when lever $l$ is tripped, substantially as specified.

5. The combination of reciprocating arm or cross-head 5, cam-lever 8, adapted to be engaged by a trundle on said arm, pawl 10, pivoted to and actuated by said lever, the ratchet 11, and a relief-pawl supported by standard A, substantially as specified.

6. The combination of loose collar 27, provided with arm 46, supporting cutting-block 42, lever 35, pivotally mounted on said collar and provided with cutting-punch 37, and arranged to be actuated by rod 38, connected with arm 40, carried by plunger 2, and devices arranged to circumferentially vibrate said collar and bring punch 37 and its coacting block 42 into and out of the path of the eyelet-carrying needle 54, and the male and female eyelet-setting punches 48 50, substantially as specified.

7. The combination of rotary reciprocating collar 27, its arm 46, cutting-block 42, and punch-lever 35, vibrating cam-lever 8, and pitman 29, pivotally connected with said lever 8 and collar 27, and arranged to actuate the latter, substantially as specified.

8. In an eyeleting-machine, the combination of male punch 48, stop 55, plunger 51, its hollow punch 50, and eyelet-carrying rod 54, extending through both said plunger and hollow punch, and held in position therein by frictional contact, and arranged to be projected beyond punch 50 by impact with said stop, and to be depressed below the plunger by contact with punch 50, substantially as specified.

9. The pivotal thumb-rest 90, combined with a detachable locking device, 92, a reciprocating detacher, 93, and a returning-spring, 94, substantially as specified.

10. In combination with the rotative turret 103 and its non-rotative bottom 102, the vibrating chute 107, connected with said bottom, and coacting mechanism adapted to move said chute into position for the engagement of the eyelets by carrying-rod 54, and out of the path of punch 50, substantially as specified.

11. The combination of turret-bottom 102, chute 107, vibratory collar 27, connected with the turret-bottom by rod 109, and arranged to move the chute in one direction, and a reacting spring, 110, to return said chute, substantially as specified.

12. In combination with the work-supporting table 43, the vibrating arm 56, its pivotal arm 57, provided with the eyelet-entering spur 58, a depressing device for disengaging said spur from the eyelet, and a spring to elevate and engage the same, substantially as specified.

13. The combination of lever 62, arranged to be actuated by plunger 51, acting on stud 63, lever 60, arranged to be actuated by lever 62 and to depress pivotal arm 57 by engaging its stud 61, substantially as specified.

14. The combination of lever 56, its eyelet-engaging arm 57, spacing-cam 69, gage-arm 66, carried by said lever, ratchet 73, connected with said cam, and pawl 74, actuated by lever 56 and arranged to rotate said ratchet and cam, substantially as specified.

15. The combination of lever 56, its gage-arm 66, gage-cam 69, ratchet 73, secured to said cam, relief-pawl 81, and actuating-pawl 80, arranged to be operated by lever 56, and provided with a returning-spring, substantially as specified.

16. In combination with ratchet 73, pawl 74, mounted on vibrating arm 75, and provided with returning-spring 77 and engaging-spring 78, and constructed and arranged to be actuated by stud 79 of lever 56, substantially as specified.

17. In combination with spacing-cam 69 and its actuating-ratchet 73, mounted on stud 70, and an actuating-pawl mechanism, the helical spring 86, with an arm, 87, united with and arranged to rotate stud 70, carrying said cam and ratchet, and thereby return the same to first position, substantially as specified.

18. The combination of spacing-cam 69 and coacting mechanism, whereby the spaces between the eyelets are automatically controlled, as specified, ratchet 11, pivoted with an adjustable tripper-arm 15, and connecting devices whereby clutch $d$ is disengaged from driving-pulley B, as described, and rock-shaft 26, connected with said tripping devices by rod 24, and arranged at 84 to trip pawls 74 81, which engage said spacing-cam, substantially as specified.

19. The combination of pivotal lever 19, actuated by rod $v$, rod 24, connecting said lever and arm 25, rock-shaft 26, provided with arm 25, and an angle, 84, and pawl 81, arranged to be tripped by said angle, to disengage pawl 74 from its ratchet 73, substantially as specified.

20. The combination of lever 56, its pivotal arm 57, and spur 58 thereon, spring 59, levers 60 62, actuated by plunger 50, and slotted work-support 43, substantially as specified.

21. The combination of toothed spacing-cam 69, a ratchet-and-pawl mechanism arranged to rotate the cam when actuated, lever 56, arranged to actuate the pawl-and-ratchet devices, arm 66, provided with stud 68, to engage said cam and arrest the movement of the lever by which such arm is carried, and pivotal arm 57, also carried by said lever, and provided with spur 58 to engage the inserted eyelet and feed forward the material being eyeleted, all substantially as specified.

22. The combination of work-supporting table 43, the vertically-moving eyelet-engaging spur 58, and the vibrating keeper 65, arranged to move horizontally with said spur, substantially as specified.

23. In an eyeleting-machine, the combination of turret 103, arranged to be continuously rotated, the reciprocating punches 37 48, and die or set 50, and ratchet 11, its adjustable tripper-arm 15, and the tripping devices whereby clutch $d$ is disengaged from pulley B and the eyelet-setting devices rendered inoperative, substantially as specified.

HENRY H. CUMMINGS.

Witnesses:
EUGENE HUMPHREY,
T. W. PORTER.